(12) United States Patent
Wiethe et al.

(10) Patent No.: US 7,014,592 B2
(45) Date of Patent: Mar. 21, 2006

(54) SYSTEM AND METHOD FOR CONTROLLING AN AUTOMATIC TRANSMISSION IN A VEHICLE

(75) Inventors: Philip Wiethe, Ann Arbor, MI (US); Charles Suter, South Lyon, MI (US); Ken Sovel, Lake Havasu City, AZ (US); Kurt Nickerson, Farmington, MI (US); Bruce Palansky, Westland, MI (US); Bradley Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 10/605,945

(22) Filed: Nov. 7, 2003

(65) Prior Publication Data

US 2005/0101437 A1    May 12, 2005

(51) Int. Cl.
*F16H 59/48* (2006.01)
*F16J 61/04* (2006.01)
*B60K 41/20* (2006.01)

(52) U.S. Cl. .......................... 477/120; 477/148; 477/94
(58) Field of Classification Search .......... 477/118–20, 477/94, 148; 701/55–6
See application file for complete search history.

(56) References Cited

U.S. PATENT DOCUMENTS

| 4,916,979 | A  | * | 4/1990  | Irwin ............................ 477/94 |
| 5,016,495 | A  | * | 5/1991  | Takizawa ....................... 477/94 |
| 5,366,425 | A  | * | 11/1994 | Kusaka et al. ................ 477/118 |
| 5,618,243 | A  | * | 4/1997  | Kondo et al. ................. 477/118 |
| 6,123,644 | A  | * | 9/2000  | Janecke et al. ............... 477/120 |
| 6,199,001 | B1 | * | 3/2001  | Ohta et al. ..................... 701/51 |
| 6,231,474 | B1 | * | 5/2001  | Hawarden et al. ............. 477/94 |
| 6,421,596 | B1 | * | 7/2002  | Lee ............................... 701/51 |
| 2002/0158511 | A1 | * | 10/2002 | Baumgartner et al. ....... 303/199 |

* cited by examiner

*Primary Examiner*—Roger Pang
(74) *Attorney, Agent, or Firm*—David B. Kelley; Brooks & Kushman

(57) ABSTRACT

A method for controlling an automatic transmission in a vehicle is provided. The method selectively provides automatic engine braking for the vehicle. When it is determined that automatic engine braking is desired, the upshift schedule is increased, such that a higher vehicle speed is required to upshift for any given accelerator pedal position. The transmission is automatically downshifted to a lower gear to provide engine braking for the vehicle, when a vehicle acceleration threshold is exceeded. The automatic downshifting of the transmission can occur when the brake pedal is engaged, and when the brake pedal is disengaged.

20 Claims, 5 Drawing Sheets

SYSTEM AND METHOD FOR CONTROLLING AN AUTOMATIC TRANSMISSION IN A VEHICLE

BACKGROUND OF INVENTION

1. Field of the Invention

The present invention relates to a system and method for controlling an automatic transmission in a vehicle.

2. Background Art

Automatic transmissions have long offered a number of manual gears that can be selected by the vehicle operator when driving conditions so dictate. For example, when driving on a steep incline, the driver may wish to manually downshift the automatic transmission into a lower gear to reduce the amount of pedal braking necessary to keep the vehicle at a moderate speed. In addition, a large vehicle, or one that hauls or tows heavy cargo, may benefit from the use of manually selected gears even when the vehicle is not on a steep incline. For example, the braking force required to stop a heavy vehicle, or a vehicle that hauls or tows heavy cargo, may be high enough to quickly wear brake pads if pedal braking is used exclusively. Thus, it may be beneficial to manually downshift to employ some engine braking even on relatively level road surfaces.

Although professional truck drivers are familiar with the use of downshifting to provide engine braking to slow a vehicle, the average passenger car driver may not be. Despite the availability of manually selectable low gears on most automatic transmissions, an average passenger car driver may not take advantage of them. Thus, it is desirable to provide a system and method for controlling an automatic transmission, such that the transmission is automatically downshifted into a lower gear when it is determined that engine braking is desired. Moreover, it may be beneficial to increase the speed at which the transmission automatically upshifts to a higher gear, so that the transmission remains in a lower gear for a longer period of time. The lower gear can provide additional torque that may be beneficial when towing or hauling heavy cargo. Some large vehicles, such as motor homes, currently employ the use of automatic transmissions that automatically downshift to help slow the vehicle when the driver applies the brakes when descending long, steep grades. However, a need still exists for a system and method for controlling an automatic transmission that will provide automatic downshifting when the brake pedal is not engaged, and that can determine when and how to automatically downshift based on one or more vehicle conditions.

SUMMARY OF INVENTION

Accordingly, the invention provides a method for controlling an automatic transmission in a vehicle. The vehicle includes an engine, a brake pedal, and an accelerator pedal. The method selectively provides automatic engine braking for the vehicle. The transmission has a plurality of shift points including upshift points for defining when the transmission is allowed to shift to a higher gear, and downshift points for defining when the transmission is allowed to shift to a lower gear. Each of the shift points is based on vehicle speed and accelerator pedal position. The method includes determining when automatic engine braking is desired. At least some of the upshift points are increased when it is determined that automatic engine braking is desired. The increase in each of the at least some upshift points effects an increase in the vehicle speed at which a corresponding shift to a higher gear is allowed. The method also includes automatically downshifting the transmission to a lower gear, thereby providing engine braking for a vehicle, when it is determined that automatic engine braking is desired and at least one vehicle condition matches a corresponding predetermined vehicle condition. The transmission can be automatically downshifted when the brake pedal is engaged, and when the brake pedal is disengaged.

The invention also provides a method for controlling an automatic transmission in a vehicle. The vehicle includes an engine, an accelerator pedal, a brake pedal, and first and second brake pedal sensors. The method selectively provides automatic engine braking for the vehicle. The transmission has a plurality of shift points including upshift points for defining when the transmission is allowed to shift to a higher gear, and downshift points for defining when the transmission is allowed to shift to a lower gear. Each of the shift points is based on vehicle speed and accelerator pedal position. The method includes determining when automatic engine braking for the vehicle is desired. At least some of the upshift points are increased when it is determined that automatic engine braking is desired. The increase in each of the at least some upshift points effects an increase in the vehicle speed at which a corresponding shift to a higher gear is allowed. A determination is made as to whether the first or second brake sensor indicates that the brake pedal is engaged. The method further includes automatically downshifting the transmission to a lower gear when it is determined that engine braking is desired and at least one vehicle condition matches a corresponding predetermined vehicle condition.

The invention further includes a system for controlling an automatic transmission in a vehicle. The vehicle includes an engine, a brake pedal, first and second brake pedal sensors, an accelerator pedal, and an accelerator pedal sensor. The system selectively provides at least first and second shift modes. The second shift mode selectively provides automatic engine braking for the vehicle. The transmission has a plurality of shift points, including upshift points for defining when the transmission is allowed to shift to a higher gear, and downshift points for defining when the transmission is allowed to shift to a lower gear. Each of the shift points is based on vehicle speed and accelerator pedal position. The system includes a controller in communication with the transmission, the engine, the first and second brake pedal sensors, and the accelerator pedal sensor. The controller is configured to determine whether automatic engine braking is desired. The controller is further configured to select the first shift mode when it is determined that automatic engine braking is not desired, and to select the second shift mode when it is determined that automatic engine braking is desired.

DETAILED DESCRIPTION

Figure 1:
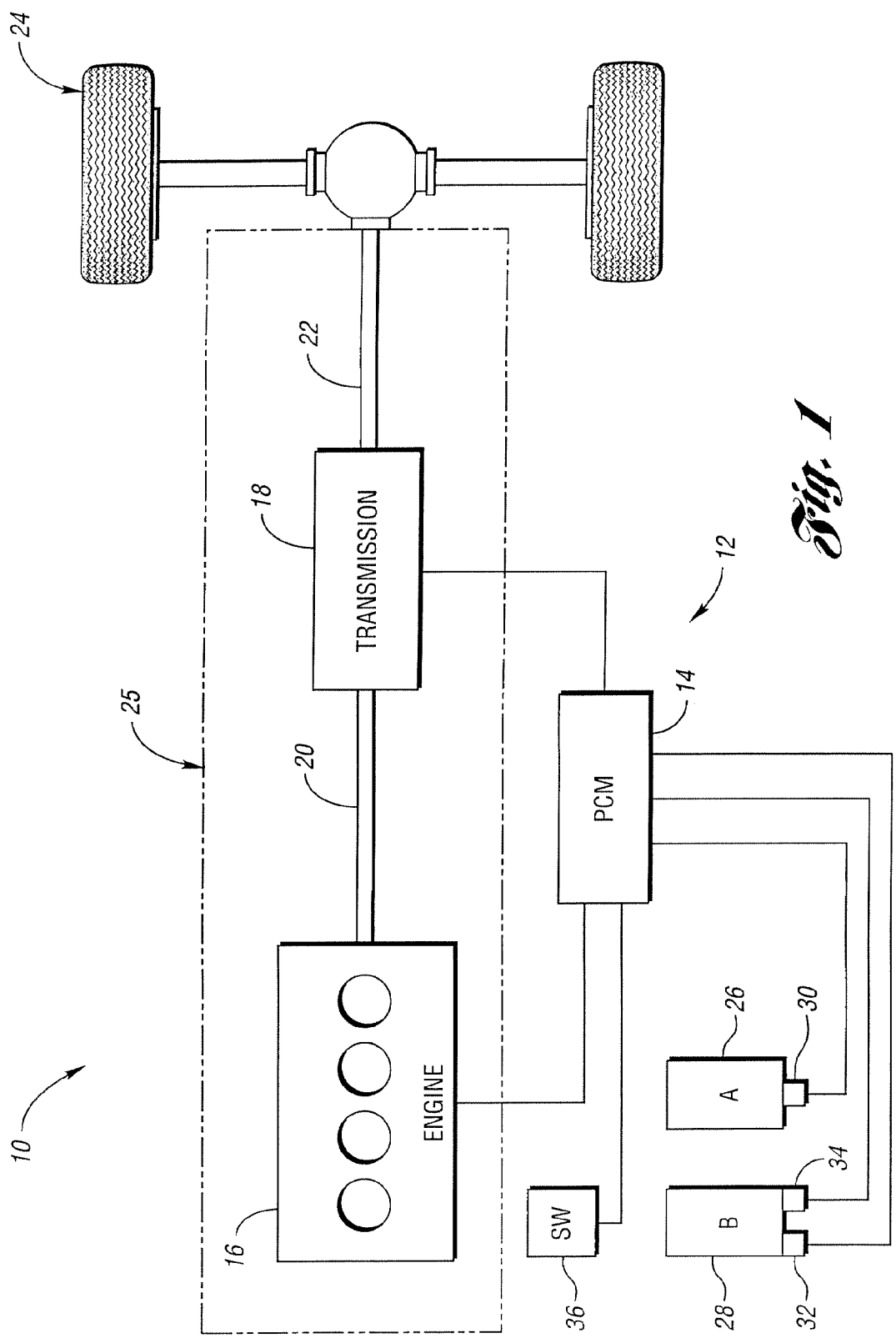
FIG. 1 is a schematic representation of a vehicle including a system in accordance with the present invention.

FIG. 1 shows a portion of a vehicle 10, including a system 12 in accordance with the present invention. The system 12 includes a controller, or powertrain control module (PCM) 14, which is connected directly to an engine 16 and an automatic transmission 18. In the embodiment shown in FIG. 1, the PCM 14 is connected directly to the engine 16 and the transmission 18; however, other configurations are possible. In one such configuration, the engine 16 and the transmission 18 have separate controllers, for example, an engine control module (ECM) and a transmission control module (TCM), which communicate directly with each other. A vehicle system controller (VSC) could also be used to communicate with a TCM and an ECM, for example, on a controller area network (CAN). Similarly, a controller, such as the PCM 14, can be used in vehicles having different configurations from the one illustrated in FIG. 1. For example, the present invention can be used with alternative vehicle forms, such as hybrid electric vehicles (HEV), fuel cell vehicles, or hybrid fuel cell vehicles, just to name a few.

The vehicle 10 also includes a transmission input shaft 20, which connects the engine 16 to the transmission 18, and a transmission output shaft 22, which connects the transmission 18 to the vehicle wheels 24. Collectively, the engine 16, the transmission 18, and the input and output shafts 20,22, make up a powertrain 25. An accelerator pedal 26 and a brake pedal 28 are operated by a vehicle operator to selectively increase and decrease the speed of the vehicle 10. The accelerator pedal 26 includes an accelerator pedal sensor 30, which is connected directly to the PCM 14. Similarly, the brake pedal 28 includes a first brake pedal sensor, or brake position sensor 32, and a second brake pedal sensor, or brake pressure sensor 34. As explained more fully below, the use of two separate brake pedal sensors helps to facilitate control of the transmission 18 by the PCM 14.

Programmed into the PCM 14 are at least two different shift modes. The first shift mode is a normal mode, which may be used when the vehicle 10 is not towing or hauling heavy cargo. The second shift mode, or tow/haul mode, may be used when the vehicle 10 is towing or hauling heavy cargo. The PCM 14 is programmed with a number of shift points for each of the shift modes. The shift points include upshift points for defining when the transmission 18 is allowed to shift to a higher gear, and downshift points for defining when the transmission 18 is allowed to shift to a lower gear. The shift points are programmed into the PCM 14, and are represented by vehicle speeds for given accelerator pedal positions. The PCM 14 signals the transmission 18 to shift to a higher or lower gear, when a shift point is reached. The PCM 14 is configured to select the normal shift mode when it is determined that automatic engine braking is not desired, and to select the tow/haul shift mode when it is determined that automatic engine braking is desired.

There are a number of ways that the PCM 14 can determine whether automatic engine braking is desired, and therefore, whether to select the normal or tow/haul shift mode. For example, a manually operated switch 36 can be actuated by the vehicle operator to indicate that automatic engine braking is desired. Alternatively, the PCM 14 may determine that automatic engine braking is desired when a predetermined set of vehicle conditions are satisfied. The set of vehicle conditions may include such things as the vehicle 10 traveling downhill, the vehicle speed increasing, and the accelerator pedal 26 not being engaged. Of course, this set of vehicle conditions may be modified to exclude some conditions, and/or include others.

Figure 2:
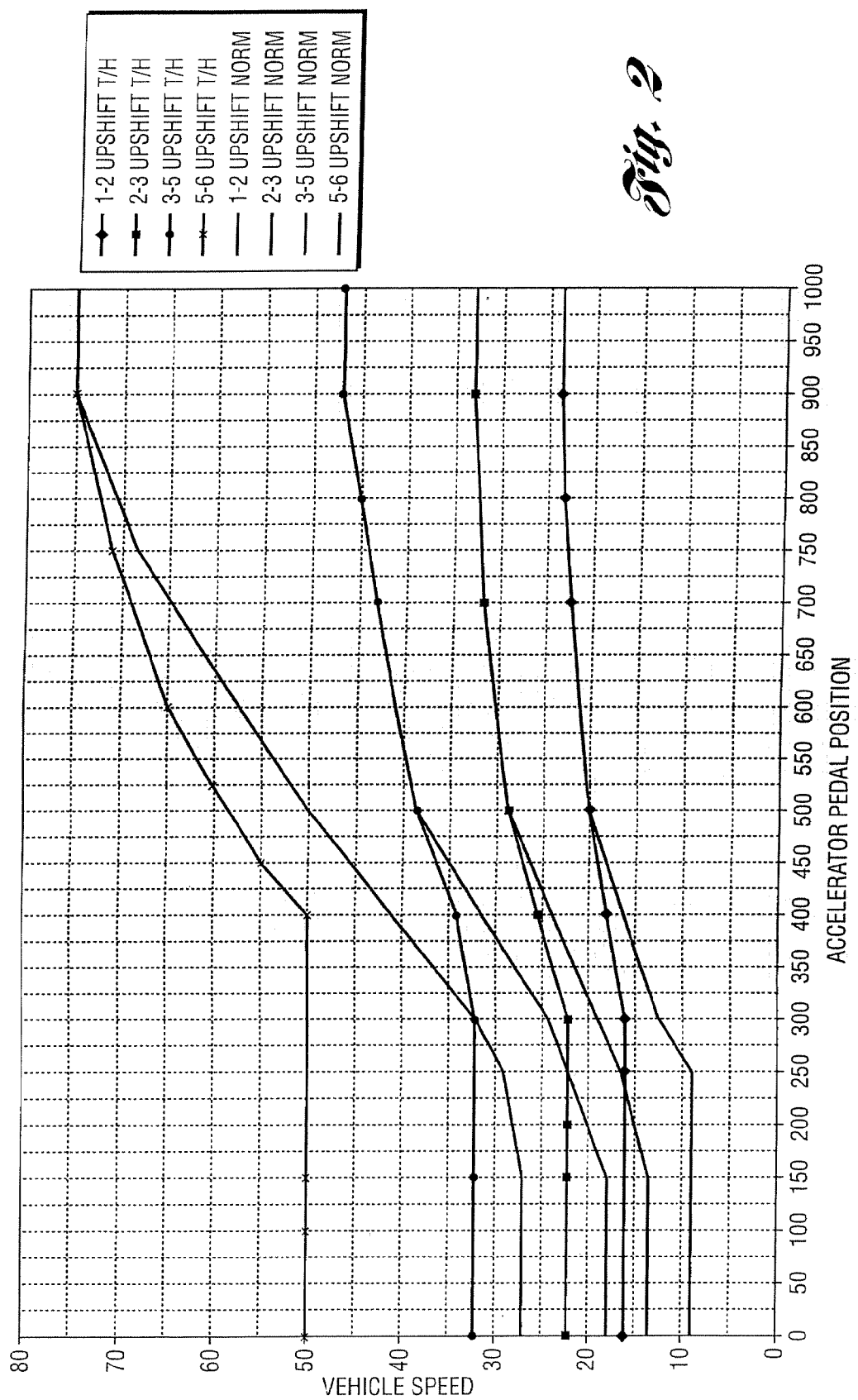
FIG. 2 is an upshift schedule illustrating upshift points for a normal shift mode and a tow/haul shift mode.

When the PCM 14 determines that automatic engine braking is desired, it selects the tow/haul shift mode. When this occurs, at least some of the upshift points are increased. This effects an increase in the vehicle speed at which a corresponding shift to a higher gear is allowed. FIG. 2 shows a shift schedule for the normal and tow/haul shift modes. As readily seen from the chart, the upshift point for any given accelerator pedal position is higher for each tow/haul upshift point than for a normal upshift. As explained in conjunction with the flow chart 38, shown in FIGS. 3A and 3B, the PCM 14 is configured to automatically downshift the transmission 18 into a lower gear, thereby providing engine braking for the vehicle 10, when the tow/haul shift mode is selected, and at least one vehicle condition matches a corresponding predetermined vehicle condition. Unlike some automatic downshifting systems, the PCM 14 can provide automatic downshifting of the transmission 18 regardless of whether the brake pedal 28 is engaged or disengaged.

Figure 3A:
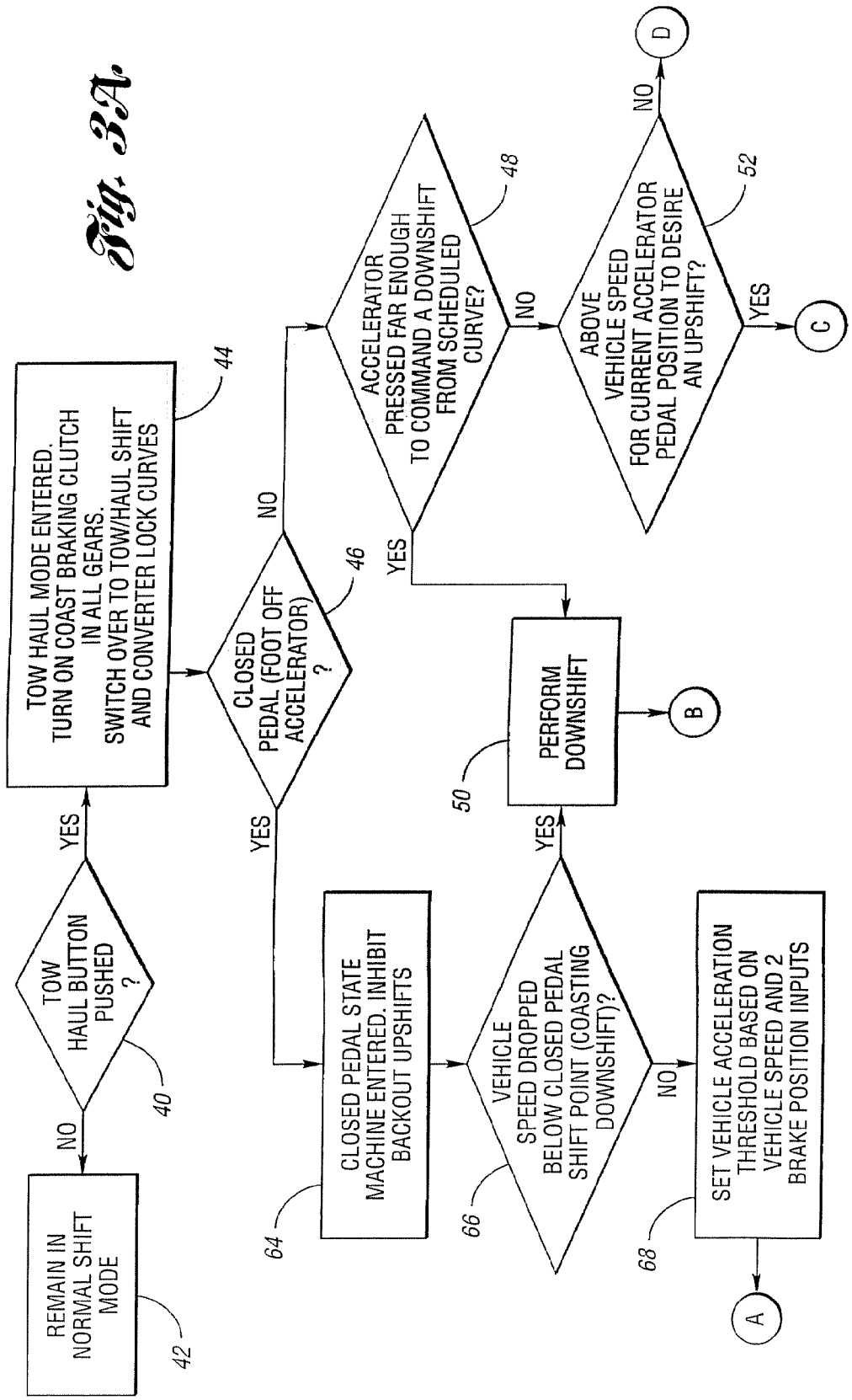
FIGS. 3A and 3B are a flow chart illustrating a method in accordance with the present invention.
Figure 3B:
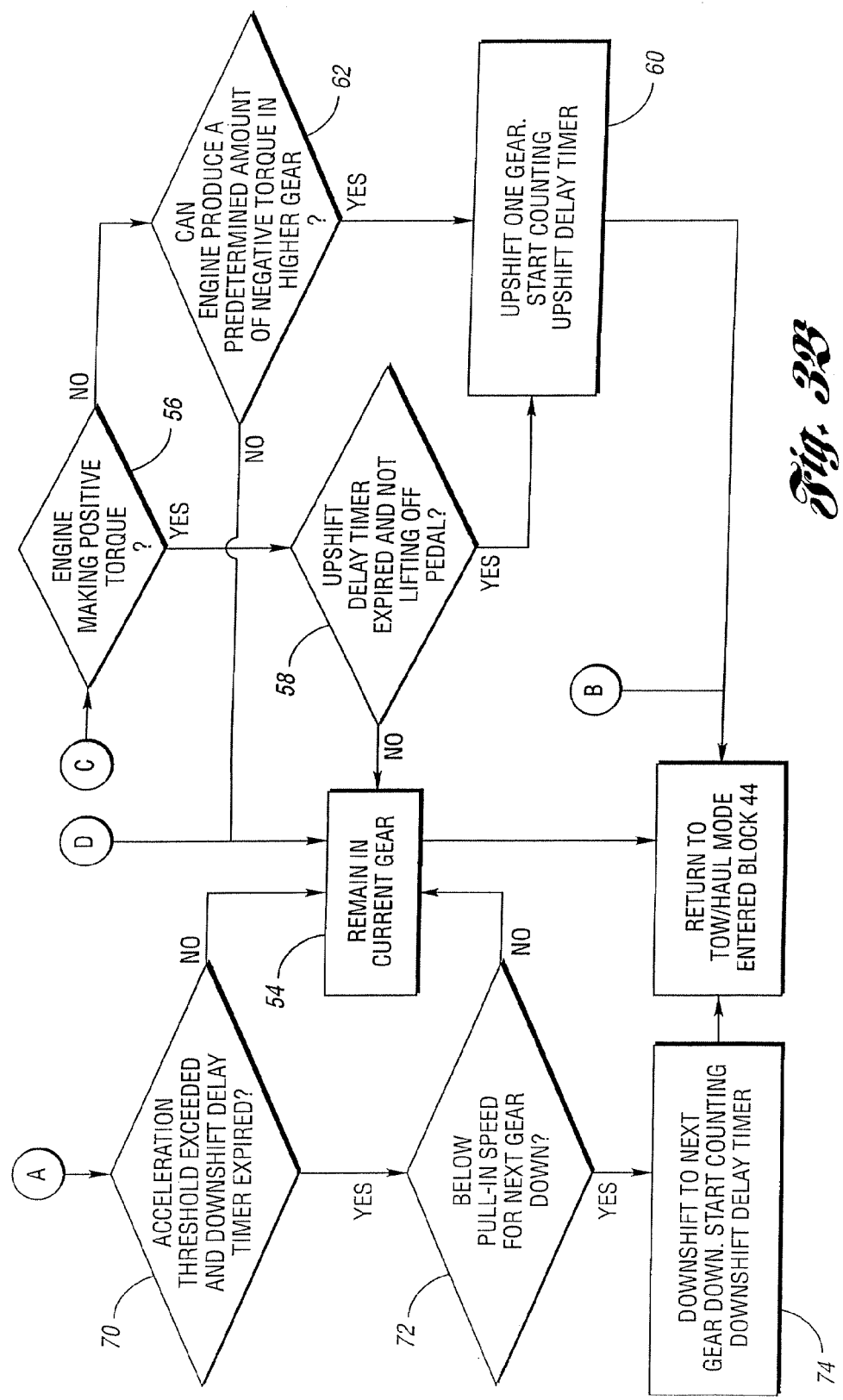

The flow chart 38, shown in FIGS. 3A and 3B, illustrates a method in accordance with the present invention. The control sequence logic for executing the steps in the flow chart 38 is programmed into the PCM 14. It is worth noting, however, that the algorithm for executing these steps could be programmed into another controller that communicates with the PCM 14 in order to appropriately control the transmission 18. At the first decision block 40, it is determined whether automatic engine braking is desired. Specifically, in the embodiment shown in FIGS. 3A and 3B, it is determined whether a tow/haul button has been pressed. The tow/haul button corresponds to the manual switch 36 illustrated in FIG. 1. Typically, the tow/haul button would be pressed by a vehicle operator when the vehicle 10 is towing or hauling heavy cargo. If the PCM 14 determines that the tow/haul button is not pressed, the PCM 14 selects, or remains in, the normal shift mode—see block 42.

If the PCM 14 determines that the tow/haul button is pressed, the tow/haul shift mode is entered—see block 44. When the tow/haul shift mode is entered, the PCM 14 executes a number of steps. For example, it increases the number of transmission gears in which engine braking is enabled. In the embodiment shown in FIGS. 3A and 3B, this means that a coast braking clutch is turned on for all gears. The coast braking clutch, which resides within the transmission 18, facilitates engine braking when it is engaged. In order to eliminate torque disturbance on a coasting downshift to first gear, the coast braking clutch may not be engaged until the vehicle 10 comes to a stop, the powertrain 25 outputs positive torque, or the vehicle 10 starts to accelerate.

As further seen in block 44, the PCM 14 adjusts the upshift schedule and the converter lock curves. An example of an adjusted upshift schedule is shown in FIG. 2. The converter lock curves are also adjusted in the tow/haul shift mode to further enhance engine braking. Specifically, the torque converter on the transmission 18 is allowed to lock in more gears. This not only helps to keep down the temperature of the transmission fluid, but also allows the engine 16 to operate at a higher speed, thereby enhancing engine braking.

At decision block 46, it is determined whether the vehicle 10 is in a closed pedal state. A closed pedal state occurs when a vehicle operator is not engaging an accelerator pedal, such as the accelerator pedal 26. If the vehicle is not at closed pedal, it is then determined whether the accelerator 26 is engaged far enough to command a downshift based on a predetermined downshift schedule—see decision block 48. Unlike the upshift schedule, which is adjusted in tow/haul mode to delay upshifts based on vehicle speed, driver demand downshifts are not delayed. Thus, when a driver presses the accelerator pedal 26 far enough to expect a downshift, the PCM 14 will command the transmission 18 to perform the downshift—see block 50. Conversely, if the accelerator pedal 26 is not pressed far enough to command a downshift, a determination is made regarding a transmission upshift—see decision block 52.

Specifically, at decision block 52, it is determined whether the speed of the vehicle 10 is above the upshift point for the current accelerator pedal position. If the answer is "no", the transmission 18 remains in the current gear—see block 54. If, however, the speed of the vehicle 10 is above the upshift point for the current accelerator pedal position, additional determinations must be made.

At decision block 56, it is determined whether the engine 16 is producing positive torque. This determination is made, because engine braking only occurs when the engine generates net negative torque. Thus, if the engine 16 is producing positive torque, it is assumed that engine braking is not desired. The next determinations include whether an upshift delay timer has expired, and whether the vehicle operator's foot is still on the accelerator pedal 26—see decision block 58.

The upshift delay timer is used in conjunction with single-step upshifts to prevent stacked upshifts. Stacked, or multiple, upshifts could occur if the current transmission gear was multiple gears down from what the shift schedule would call for at the given speed. The upshift delay timer is used to delay upshifts by a predetermined amount of time after the last upshift has occurred. This forces the upshifts to be staggered, so that multiple upshifts do not occur almost simultaneously. If the upshift delay timer has not expired, or the vehicle operator is reducing pressure on the accelerator pedal 26, the transmission 18 remains in the current gear—see block 54. If, however, the upshift delay timer has expired, and the vehicle operator is not disengaging the accelerator pedal 26, the PCM 14 commands the transmission 18 to upshift one gear. The upshift delay timer is then reset and restarted—see block 60.

If, at decision block 56, it is determined that the engine 16 is not producing positive torque, another determination is made at decision block 62. Specifically, it is determined whether the engine 16 can produce a predetermined amount of negative torque if the transmission 18 is upshifted one gear. Making this determination helps to ensure that desired engine braking—characterized by the negative engine torque—is not eliminated by a transmission upshift. Therefore, if it is determined that the engine 16 can produce the predetermined amount of negative torque even when the transmission 18 is upshifted by one gear, the PCM 14 will command the transmission 18 to perform the upshift—see block 60. Again, the upshift delay timer will be reset and restarted. At this point, the control sequence returns to step 44.

The predetermined amount of negative torque referenced above, and in decision block 62, can be chosen to be any desired amount. For example, it can be based on the torque of the transmission output shaft 22, determined with the engine in the current gear. Specifically, the predetermined amount would be chosen as the amount of negative engine torque required to maintain the same output shaft torque when the transmission 18 is in the next higher gear. It may, however, be convenient to choose a slightly greater amount—i.e., more negative torque—as the predetermined amount, to account for hysteresis.

Figure 4:
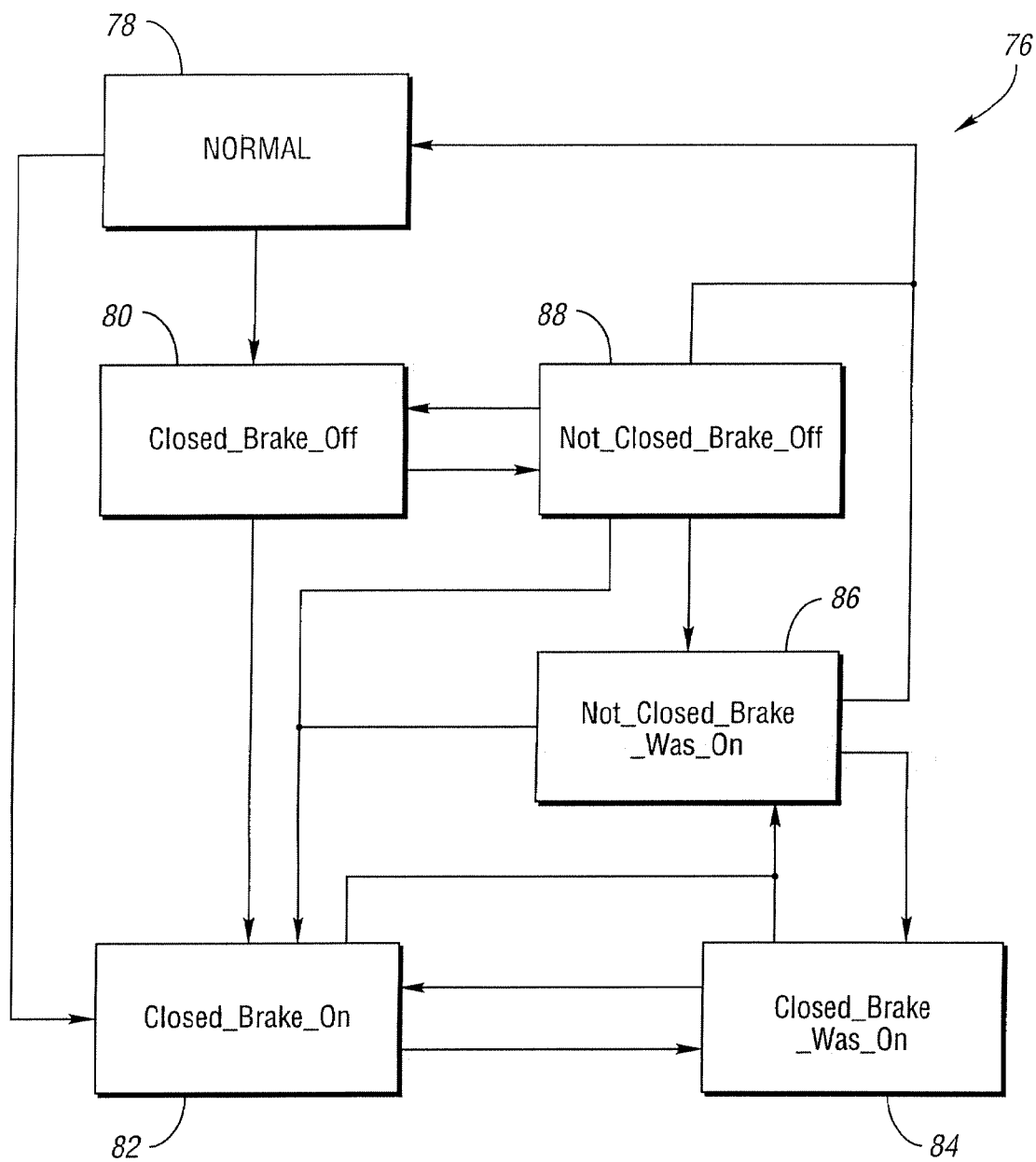
FIG. 4 is a schematic representation of a closed pedal state machine used with the method shown in FIGS. 3A and 3B.

If the vehicle 10 is at closed pedal—i.e., the accelerator pedal 26 is not engaged—a closed pedal state machine is entered—see block 64. The closed pedal state machine is illustrated in FIG. 4, and is described in more detail below. Returning to FIG. 3A, it is seen in block 64 that when the closed pedal state machine is entered, backout upshifts are inhibited. This means that when the vehicle operator's foot begins to disengage the accelerator pedal 26, such that an upshift would occur in the normal shift mode, the PCM 14 will not command the transmission 18 to upshift. This helps to provide increased engine braking when the vehicle 10 is going to the closed pedal state. Once in the closed pedal state, it is determined whether the vehicle speed has dropped below a downshift point—see decision block 66. If the vehicle speed has dropped below the downshift point, the PCM 14 commands the transmission 18 to perform the downshift—see block 50. Conversely, if the vehicle speed has not dropped below the downshift point, a vehicle acceleration threshold is set at block 68.

As seen in block 68, the vehicle acceleration threshold is based on the vehicle speed and inputs from the position and pressure brake sensors 32, 34. Specifically, if the brake pedal 28 is not engaged, the vehicle acceleration threshold is set to some positive acceleration value. If, however, the brake position sensor 32 indicates that the brake pedal 28 is engaged, but the brake pressure sensor 34 does not indicate that the brake pedal 28 is engaged, the vehicle acceleration threshold is set to zero, or some very small positive value. Thus, the acceleration of the vehicle 10 need only be slightly positive to exceed the acceleration threshold.

Finally, if the brake pressure sensor 34 indicates that the brake pedal 28 is engaged, the vehicle acceleration threshold is set to some negative acceleration value. Thus, the acceleration threshold will be exceeded unless the vehicle 10 is decelerating at a high rate, indicating a "hard stop" condition. It is worth noting that the brake position sensor 32 will indicate that the brake pedal 28 is engaged before the brake pressure sensor 34 so indicates. Therefore, when the brake pressure sensor 34 indicates that the brake pedal 28 is engaged, it is assumed that the brake position sensor 32 also indicates brake pedal engagement.

After the vehicle acceleration threshold is set, it is then determined, at decision block 70, whether the vehicle acceleration threshold has been exceeded, and whether a delay timer has expired. The downshift delay timer measures the time that has passed since a previous transmission downshift has occurred. Requiring a predetermined amount of time to pass between downshifts reduces the number of downshifts that will occur in a short period of time—e.g., when the vehicle 10 crests the top of a hill. If the vehicle acceleration threshold is not exceeded, or if the downshift delay timer has not expired, the transmission 18 remains in the current gear—see block 54.

If the vehicle acceleration threshold has been exceeded, and the downshift delay timer has expired, another determination is made at decision block 72. Specifically, it is determined whether the speed of the engine 16 is below a predetermined speed. The predetermined speed, also called a "pull-in" speed, is based on the transmission gear immediately below the current transmission gear. Because the engine speed will increase when the transmission 18 downshifts, it is desirable to require that the engine speed will not increase beyond the maximum desired engine speed of the downshifted gear.

If, at decision block 72, it is determined that the engine 16 is not below the pull-in speed for the next lower gear, the transmission 18 remains in the current gear—see block 54.

Conversely, if the engine 16 is below the pull-in speed for the next lower gear, the PCM 14 commands the transmission 18 to downshift one gear—see block 74. At this point, the downshift delay timer is reset and restarted, and the control sequence returns to block 44.

As mentioned above, FIG. 4 shows the closed pedal state machine 76, and the various states the vehicle 10 may encounter. The closed pedal state begins with a transition from block 78, where the vehicle 10 is in a "normal" mode with the accelerator pedal 26 engaged, to one of two different closed pedal states. The first closed pedal state, shown in block 80, occurs when neither the accelerator pedal 26, nor the brake pedal 28, is engaged. In this state, the vehicle acceleration threshold is set to some predetermined positive value, so that a downshift will only occur if the acceleration of the vehicle 10 is positive, and exceeds the acceleration vehicle threshold.

The second state which can be entered when going to a closed pedal state is shown in block 82. This is a closed pedal state with the brake on—i.e., the accelerator pedal 26 is not engaged, but the brake pedal 28 is engaged. As discussed above, two different vehicle acceleration thresholds are used in this state, depending on whether the engagement of the brake pedal 28 is indicated by the position brake sensor 32 or the pressure brake sensor 34. If the brake pedal 28 is disengaged, the state entered is a closed pedal state where the brake was on—see block 84. This state could be controlled the same as, or similar to, the state shown in block 80. This is because both states reflect a closed pedal state with the brake off. The difference is that the state illustrated in block 84 was not entered directly from the normal mode. This means that by the time the state shown in block 84 is entered, there is some control history available to the PCM 14. Thus, if desired, adjustments could be made to the vehicle acceleration threshold to reflect information gathered from actual operating conditions.

When any of the closed pedal states, illustrated in blocks 80, 82 and 84, transition into a non-closed pedal state, the normal state is not immediately entered. For example, block 86 represents a non-closed pedal state where the brake was previously on. Similarly, block 88 represents a non-closed pedal state where the brake is currently off, and was also previously off. In each of the states 86, 88, a predetermined amount of time must pass before the closed pedal state machine 76 allows a transition back to a normal, non-closed pedal state, shown in block 78. Requiring the predetermined time to pass before transitioning into a normal mode, helps to ensure that a non-closed pedal state is not transient—i.e., that the vehicle operator intends to remain in non-closed pedal state. Upon returning to the normal mode, the control sequence performs actions in accordance with the tow/haul shift mode for a non-closed pedal state. The control sequence continues, until the switch 36 is manually set to indicate a return to the normal shift mode. Alternatively, a return to the normal shift mode can be commanded from inferred operating conditions.

While the best mode for carrying out the invention has been described in detail, those familiar with the art to which this invention relates will recognize various alternative designs and embodiments for practicing the invention as defined by the following claims.

The invention claimed is:

1. A method for controlling an automatic transmission in a vehicle, the vehicle including an engine, a brake pedal, and an accelerator pedal, the method selectively providing automatic engine braking for the vehicle, the transmission having a plurality of shift points, including upshift points for defining when the transmission is allowed to shift to a higher gear, and downshift points for defining when the transmission is allowed to shift to a lower gear, each of the shift points being based on vehicle speed and accelerator pedal position, the method comprising:

determining when automatic engine braking is desired;

increasing at least some of the upshift points when it is determined that automatic engine braking is desired, the increase in each of the at least some upshift points effecting an increase in the vehicle speed at which a corresponding shift to a higher gear is allowed;

setting a vehicle acceleration threshold;

delaying subsequent transmission downshifts by a predetermined amount of time after a transmission downshift has occurred; and automatically downshifting the transmission to a lower gear, thereby providing engine braking for the vehicle, when it is determined that automatic engine braking is desired, vehicle acceleration is above the vehicle acceleration threshold, the predetermined amount of time has passed since a previous transmission downshift, and the vehicle speed is below a predetermined speed, the predetermined speed being based on a transmission gear immediately below a current transmission gear, and wherein the automatic downshifting of the transmission can occur when the brake pedal is engaged, and when the brake pedal is disengaged.

2. The method of claim 1, further comprising inhibiting transmission upshifts when it is determined that automatic engine braking is desired, and the accelerator pedal is not engaged.

3. The method of claim 1, further comprising increasing the number of transmission gears in which engine braking is enabled when it is determined that automatic engine braking is desired.

4. The method of claim 1, wherein determining when automatic engine braking is desired includes determining the position of a manually operated switch.

5. The method of claim 1, wherein determining when automatic engine braking is desired includes determining whether a set of vehicle conditions are satisfied, the set of vehicle conditions including the vehicle traveling downhill, the vehicle speed increasing, and the accelerator pedal not engaged.

6. The method of claim 1, further comprising:

delaying transmission upshifts when it is determined that automatic engine braking is desired, each of the transmission upshifts being delayed by a predetermined amount of time after the vehicle speed has reached a corresponding upshift point;

determining whether the engine is producing positive torque in a current transmission gear; and automatically upshifting the transmission to a next higher gear when it is determined that automatic engine braking is desired, the accelerator pedal is engaged, and the predetermined amount of time has passed since the vehicle speed reached an upshift point.

7. The method of claim 6, further comprising:

determining whether the engine can produce a predetermined amount of negative torque in a higher transmission gear when it is determined that the engine is not producing positive torque in the current transmission gear; and automatically upshifting the transmission to a next higher gear when it is determined that automatic engine braking is desired, the accelerator pedal is engaged, and it is determined that the engine can produce the predetermined amount of negative torque in the next higher gear.

8. A system for controlling an automatic transmission in a vehicle, the vehicle including an engine, a brake pedal, first and second brake pedal sensors, an accelerator pedal, and an accelerator pedal sensor, the system selectively providing at least first and second shift modes, the second shift mode selectively providing automatic engine braking for the vehicle, the transmission having a plurality of shift points including upshift points for defining when the transmission is allowed to shift to a higher gear, and downshift points for defining when the transmission is allowed to shift to a lower gear, each of the shift points being based on vehicle speed and accelerator pedal position, the system comprising:

a controller in communication with the transmission, the engine, the first and second brake pedal sensors, and the accelerator pedal sensor, the controller being configured to:

determine whether automatic engine braking is desired, and to select the first shift mode when it is determined that automatic engine braking is not desired, and to select the second shift mode when it is determined that automatic engine braking is desired, increase at least some of the upshift points when the second shift mode is selected, the increase in each of the at least some upshift points effecting an increase in the vehicle speed at which a corresponding shift to a higher gear is allowed, automatically downshift the transmission to a lower gear, thereby providing engine braking for the vehicle, when the second shift mode is selected and at least one vehicle condition matches a corresponding predetermined vehicle condition, and set a vehicle acceleration threshold and to delay subsequent transmission downshifts when the second shift mode is selected, the vehicle acceleration threshold being based on the vehicle speed and inputs from the first and second brake sensors, the subsequent transmission downshifts being delayed by a predetermined amount of time after a transmission downshift has occurred, and wherein the at least one vehicle condition matches a corresponding predetermined vehicle condition when vehicle acceleration is above the vehicle acceleration threshold, the predetermined amount of time has passed since a previous transmission downshift, and the vehicle speed is below a predetermined speed, the predetermined speed being based on a transmission gear immediately below a current transmission gear.

9. The system of claim 8, wherein the controller is further configured to delay transmission upshifts and to determine whether the engine is producing positive torque in a current transmission gear, when the second shift mode is selected, each of the transmission upshifts being delayed by a predetermined amount of time after the vehicle speed has reached a corresponding upshift point, the controller being further configured to automatically upshift the transmission to a next higher gear when the second shift mode is selected, the accelerator pedal is engaged, and the predetermined amount of time has passed since the vehicle speed reached an upshift point.

10. The system of claim 8, wherein the controller is further configured to determine whether the engine can produce a predetermined amount of negative torque in a higher transmission gear when it is determined that the engine is not producing positive torque in the current transmission gear, and to automatically upshift the transmission to a next higher gear when the second shift mode is selected, the accelerator pedal is engaged, and it is determined that the engine can produce the predetermined amount of negative torque in the next higher gear.

11. A method for controlling an automatic transmission in a vehicle, the vehicle including an engine, a brake pedal, and an accelerator pedal, the method selectively providing automatic engine braking for the vehicle, the transmission having a plurality of shift points, including upshift points for defining when the transmission is allowed to shift to a higher gear, and downshift points for defining when the transmission is allowed to shift to a lower gear, each of the shift points being based on vehicle speed and accelerator pedal position, the method comprising:

determining when automatic engine braking is desired;

increasing at least some of the upshift points when it is determined that automatic engine braking is desired, the increase in each of the at least some upshift points effecting an increase in the vehicle speed at which a corresponding shift to a higher gear is allowed;

automatically downshifting the transmission to a lower gear, thereby providing engine braking for the vehicle, when it is determined that automatic engine braking is desired and at least one vehicle condition matches a corresponding predetermined vehicle condition, and wherein the automatic downshifting of the transmission can occur when the brake pedal is engaged, and when the brake pedal is disengaged; and inhibiting transmission upshifts when it is determined that automatic engine braking is desired, and the accelerator pedal is not engaged.

12. The method of claim 11, wherein the at least one vehicle condition matches a corresponding predetermined vehicle condition when the vehicle speed drops below a first downshift point.

13. The method of claim 11, further comprising:

setting a vehicle acceleration threshold;

delaying subsequent transmission downshifts by a predetermined amount of time after a transmission downshift has occurred; and wherein the at least one vehicle condition matches a corresponding predetermined vehicle condition when vehicle acceleration is above the vehicle acceleration threshold, the predetermined amount of time has passed since a previous transmission downshift, and the vehicle speed is below a predetermined speed, the predetermined speed being based on a transmission gear immediately below a current transmission gear.

14. The method of claim 11, further comprising increasing the number of transmission gears in which engine braking is enabled when it is determined that automatic engine braking is desired.

15. The method of claim 11, wherein determining when automatic engine braking is desired includes determining the position of a manually operated switch.

16. The method of claim 11, wherein determining when automatic engine braking is desired includes determining whether a set of vehicle conditions are satisfied, the set of vehicle conditions including the vehicle traveling downhill, the vehicle speed increasing, and the accelerator pedal not engaged.

17. The method of claim 11, further comprising:

delaying transmission upshifts when it is determined that automatic engine braking is desired, each of the transmission upshifts being delayed by a predetermined amount of time after the vehicle speed has reached a corresponding upshift point;

determining whether the engine is producing positive torque in a current transmission gear; and automatically upshifting the transmission to a next higher gear when it is determined that automatic engine braking is desired, the accelerator pedal is engaged, and the predetermined amount of time has passed since the vehicle speed reached an upshift point.

18. The method of claim 17, further comprising:

determining whether the engine can produce a predetermined amount of negative torque in a higher transmission gear when it is determined that the engine is not producing positive torque in the current transmission gear; and automatically upshifting the transmission to a next higher gear when it is determined that automatic engine braking is desired, the accelerator pedal is engaged, and it is determined that the engine can produce the predetermined amount of negative torque in the next higher gear.

19. The method of claim 11, the vehicle further including a brake sensor, the method further comprising determining whether the brake sensor indicates that the brake pedal is engaged.

20. The method of claim 19, wherein the at least one vehicle condition matches a corresponding predetermined vehicle condition when the brake pedal is not engaged, the accelerator pedal is not engaged, and vehicle acceleration is above a predetermined positive acceleration.

* * * * *